United States Patent [19]

Cox

[11] Patent Number: 4,543,678
[45] Date of Patent: Oct. 1, 1985

[54] FEEDYARD SWEEPER

[76] Inventor: Hoy L. Cox, 1319 Mann, Larned, Kans. 67550

[21] Appl. No.: 587,665

[22] Filed: Mar. 8, 1984

[51] Int. Cl.[4] ............................................. A46B 13/02
[52] U.S. Cl. ........................................ 15/56; 15/21 R
[58] Field of Search ...................... 15/56, 21 E, 82, 87, 15/49 C, 50 C, 340

[56] References Cited

U.S. PATENT DOCUMENTS

| 3,099,852 | 8/1963 | Grant ................................... 15/21 E |
| 3,611,465 | 10/1971 | Rasmussen ............................. 15/56 |
| 3,643,274 | 2/1972 | Hodges ................................... 15/56 |
| 3,922,745 | 12/1975 | Lehman ................................... 15/87 |

FOREIGN PATENT DOCUMENTS

| 1248084 | 8/1967 | Fed. Rep. of Germany ...... 15/21 E |
| 1403051 | 5/1965 | France ................................... 15/21 E |
| 559287 | 2/1975 | Switzerland ........................ 15/21 E |
| 182536 | 5/1966 | U.S.S.R. ................................... 15/56 |

Primary Examiner—Edward L. Roberts
Attorney, Agent, or Firm—Edwin H. Crabtree

[57] ABSTRACT

A feedyard sweeper for sweeping and cleaning animal feed bunks. The sweeper readily adaptable for mounting on different types of tractors and other vehicles. Brooms mounted on the sweeper are used for cleaning all sides of the feed bunk and can be used for fluffing the feed after a rain, snow and when the feed becomes compacted, or placing the feed in piles for the animals.

6 Claims, 4 Drawing Figures

FEEDYARD SWEEPER

BACKGROUND OF THE INVENTION

This invention relates to a sweeper for driving brooms and more particularly, but not by way of limitation, to a sweeper used for feedlot operations for cleaning bunks used in feeding cattle, pigs, poultry and any other type animal receiving feed in a feed bunk.

In the following U.S. Pat. Nos. 3,922,745 to Lehman, 2,996,742 to Aimers, et al, 3,594,844 to Hargreaves, and 3,444,583 to Laurel, various types of broom driven or sweeper driven devices are shown and mounted on vehicles used for cleaning streets, driveways, highway gutters, and the like. None of them specifically disclose the combination of structure and unique features and advantages as provided by the subject invention as described herein.

SUMMARY OF THE INVENTION

The subject feedyard sweeper is readily adaptable for mounting on different types of farm tractors and the like for cleaning feedyard bunks.

The sweeper cleans all sides of a feedyard bunk along with fluffing the feed after it becomes compacted due to rain, snow or other reasons and can be used for piling the feed as necessary.

The sweeper greatly improves the time and expense necessary in cleaning heretofore hard to clean feedyard bunks, thereby providing a cleaner and more efficient feedyard operation in feeding cattle and other types of animals fattened in a feedlot operation.

The feedlot sweeper for sweeping and cleaning animal feed bunks is adapted for mounting on a tractor and the like. The sweeper includes a sweeper frame for mounting on a three-point hitch. The sweeper frame has a sweeper arm pivotally mounted on the frame. The sweeper arm is raised and lowered by a first hydraulic cylinder and ram. A second hydraulic cylinder and ram pivotally rotate a plurality of brooms mounted on a broom frame. The brooms are driven by a drive motor and endless chain connected to a broom drive shaft. The brooms are annular in shape and include mounting plates for mounting on the broom drive shaft.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
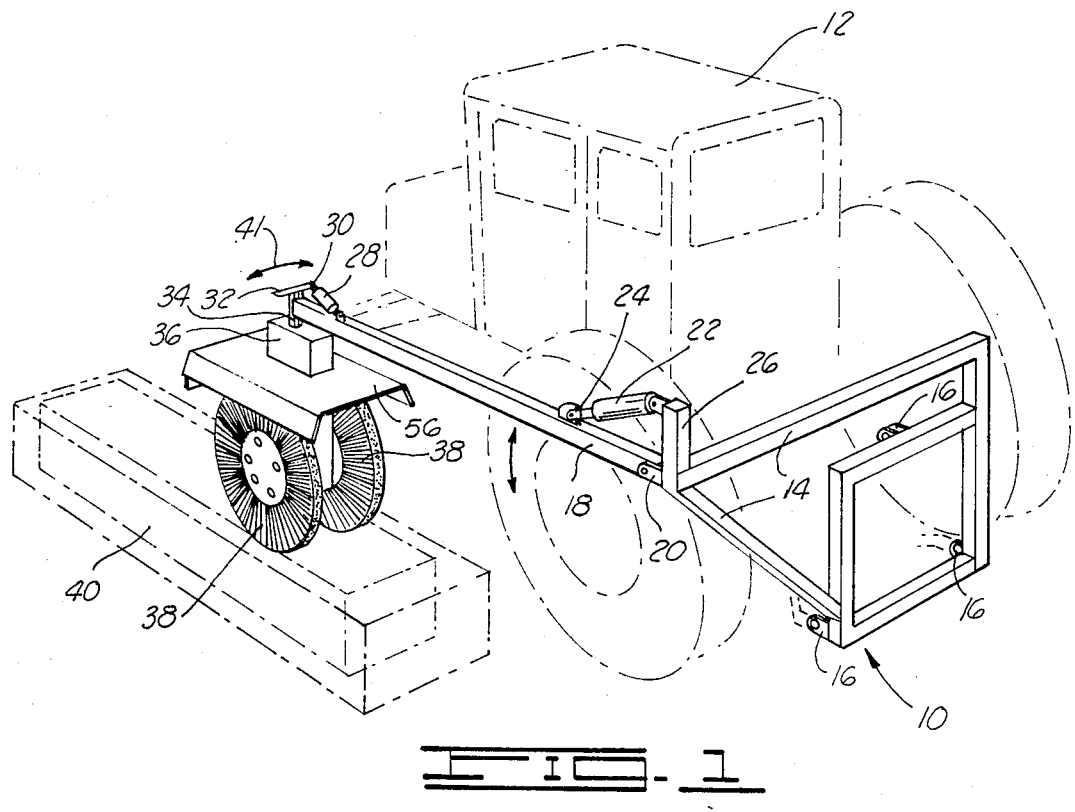
FIG. 1 illustrates the feedyard sweeper positioned for mounting on the rear of a tractor.

In FIG. 1 the feedyard sweeper is designated by general reference numeral 10. In this figure the sweeper 10 is shown positioned at the rear of a tractor 12 shown in dotted lines. While the tractor 12 is shown it can be appreciated that various types of farm tractors, vehicles, and the like can be used equally well for receiving and mounting the sweeper 10 thereon.

The sweeper 10 includes a sweeper frame 14 having brackets 16 used for mounting on a standard three-point hitch used on the rear of the tractor 12.

Mounted on the left side of the frame 14 is a sweeper arm 18 pivotally mounted on the frame 14 by bracket 20. The sweeper arm is raised and lowered by a first hydraulic cylinder 22 and ram 24 which is attached to one end of the arm 18 and a vertical post 26 which is part of the frame 14. The other end of the sweeper arm 18 includes a second hydraulic cylinder 28 and a ram 30 which is connected to a pivot arm 32.

The pivot arm 32 is part of a broom frame pivot shaft 34 which is mounted on the top of a broom frame 36. On the lower end of the broom frame 36 are mounted a plurality of annular shaped brooms 38 which are received on opposite sides of the frame 36 and shown more clearly in FIG. 2 and FIG. 3. The brooms 38 are used for cleaning the sides and the bottom of a feed bunk 40 shown in dotted lines.

Figure 2:
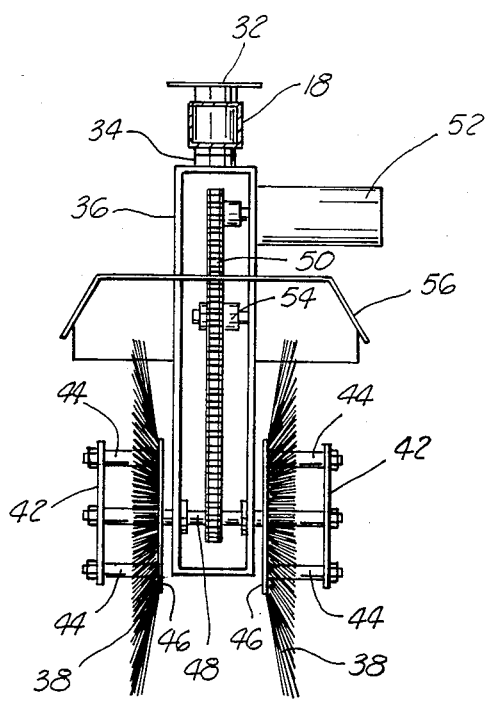
FIG. 2 illustrates a rear view of the brooms mounted on a broom frame and driven by a drive motor.

In FIG. 2 a cross section of the other end of the sweeper arm 18 can be seen connected to the broom frame pivot shaft 34 with the pivot arm 32 mounted on top thereof. The ram 30 of the second hydraulic cylinder 28 can be mounted on various positions on the pivot arm 32 for pivoting and rotating the broom frame, as indicated by arrow 41 shown in FIG. 1. This feature allows the brooms 38 to clean and sweep all sides of the bunk 40 along with the bottom of the bunk 40.

The brooms 38 are releasably attached to a broom hub plate 42 and hub lugs 44. The hub plate 42 is removed for adding or replacing the brooms 38. It can be appreciated from reviewing FIG. 2 a plurality of brooms 38 having broom mounting plates 46 can be received on the hub lugs 44 and secured by the hub plate 42.

The brooms 38 are driven by a broom drive shaft 48 having a drive sprocket and mounted on an endless chain 50 driven by a drive sprocket connected to a drive motor 52. An idle sprocket 54 is mounted on the frame 36 for applying necessary tension on the endless chain 50.

Mounted above the brooms 38 and attached to the frame 36 is a broom guard 56 or shield which is used to reflect the feed downwardly as it is cleaned from the bunk 40.

Figure 3:
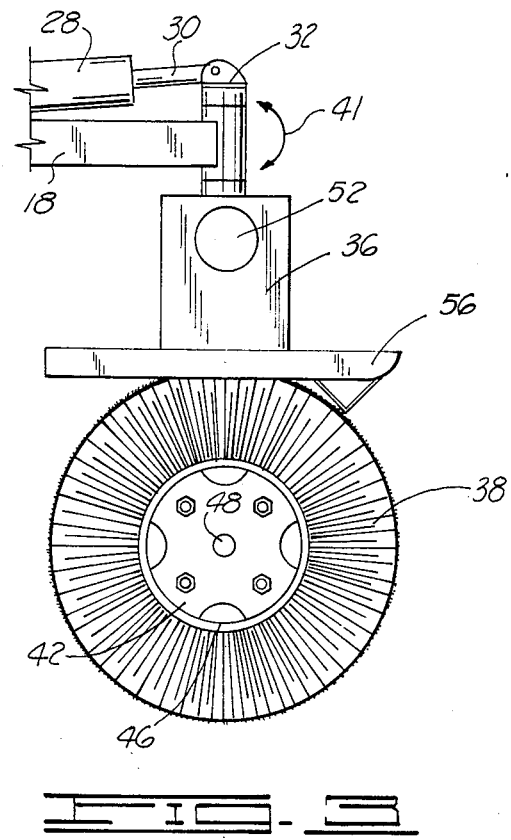
FIG. 3 illustrates a side view of the brooms and broom frame.

In FIG. 3 a side view of the frame 36 with drive motor 52 can be seen. In this view one side of one of the brooms 38 can be seen with mounting plate 46 secured to the hub plate 42 and broom drive shaft 48. Also shown in this view is the second hydraulic cylinder 28 with ram 30 connected to the pivot arm 32.

Figure 4:
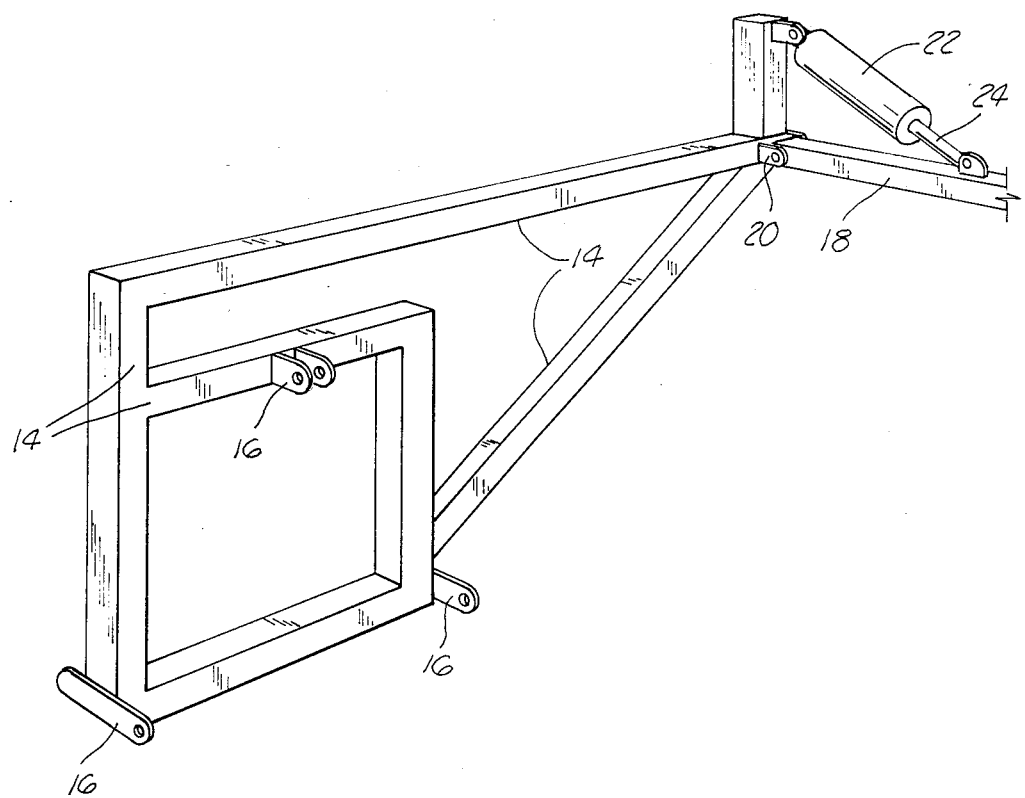
FIG. 4 illustrates a perspective view of the sweeper frame and part of the sweeper arm.

In FIG. 4 a perspective view of the sweeper frame 14 is shown with mounting brackets 16 in a position for attachment to the rear of the tractor 12. It should be kept in mind while this frame is adapted for extending the sweeper arm 18 along the left side of the tractor 12, the frame 14 can also be adapted for mounting the sweeper arm 18 along the right side of the tractor 12 should it be desired.

It should be noted that in the figures the hydraulic hoses for the first hydraulic cylinder 22 and the second hydraulic cylinder 28 are not shown and they would be standard hydraulic hoses used for driving the cylinders and connected to a standard hydraulic pump mounted on the tractor. Also the necessary connections for driving the drive motor 52 would be mounted on the tractor 12 for control by the operator of the tractor.

In operation the operator of the tractor 12 will drive adjacent a typical feed bunk 40 and lower the brooms 38 into the bunk 40. By controlling the second cylinder 28 the brooms 38 are placed in a proper position for cleaning the sides of the bunk 40. The drive motor 52 is turned on and the brooms 38 efficiently clean the bunk 40. The bottom of the bunk 40 can be cleaned by merely activating the first cylinder 22 and lowering the sweeper arm 18. As the tractor 12 is driven forward the entire bunk 40 is cleaned. The sweeper arm 18 is then raised and the operator proceeds to the next bunk.

Changes may be made in the construction and arrangement of the parts or elements of the embodiments as described herein without departing from the spirit or scope of the invention defined in the following claims.

What is claimed is:

1. A feedyard sweeper for sweeping and cleaning animal feed bunks, the sweeper mounted on a vehicle such as a tractor and the like, the sweeper comprising:
    a sweeper frame having pin connecting brackets for mounting on a three-point hitch on the rear of the tractor;
    a sweeper arm pivotally mounted on one side of the sweeper frame and extending outwardly therefrom and toward the front of the tractor;
    a first hydraulic cylinder and ram mounted on one end of the sweeper arm and the frame for raising and lowering the sweeper arm on the sweeper frame;
    a vertical pivot shaft pivotally mounted on the other end of the sweeper arm, the pivot shaft having a pivot arm mounted on top thereof;
    a broom frame mounted on the bottom of the pivot shaft and having a horizontal drive motor mounted thereon;
    a horizontal broom drive shaft rotatably mounted on the bottom of the frame, the drive motor and broom drive shaft connected by an endless chain, the horizontal broom drive shaft receiving on opposite ends of the shaft annular shaped brooms vertically disposed thereon for cleaning the sides and bottom of the feed bunk; and
    a second hydraulic cylinder and ram mounted on the other end of the sweeper arm, the ram connected to the pivot arm for pivoting the vertical pivot shaft and the brooms mounted on the horizontal drive shaft.

2. The sweeper as described in claim 1 further including a broom guard mounted on the broom frame and disposed above the rotating brooms.

3. The sweeper as described in claim 1 further including a drive sprocket mounted on the center of the horizontal broom drive shaft for engaging the endless chain thereon.

4. The sweeper as described in claim 1 further including a idle sprocket mounted on the frame and engaging the endless chain for applying tension thereon.

5. The sweeper as described in claim 1 further including a plurality of annular shaped brooms received on opposite sides of the horizontal broom drive shaft and releasably secured thereon.

6. A feedyard sweeper for sweeping and cleaning animal feed bunks, the sweeper mounted on a vehicle such as a tractor and the like, the sweeper comprising:
    a sweeper frame having pin connecting brackets for mounting on a three-point hitch on the rear of the tractor;
    a sweeper arm pivotally mounted on one side of the sweeper frame and extending outwardly therefrom and toward the front of the tractor;
    a first hydraulic cylinder and ram mounted on one end of the sweeper arm and the frame for raising and lowering the sweeper arm on the sweeper frame;
    a vertical pivot shaft pivotally mounted on the other end of the sweeper arm, the pivot shaft having a pivot arm mounted on top thereof;
    a broom frame mounted on the bottom of the pivot shaft and having a horizontal drive motor mounted thereon;
    a horizontal broom drive shaft rotatably mounted on the bottom of the frame, the drive motor and broom drive shaft connected by an endless chain, the horizontal broom drive shaft having a pair of broom hub plates and hub lugs mounted on opposite sides of the shaft for receiving a plurality of annular shaped brooms vertically disposed thereon for cleaning the sides and bottom of the feed bunks; and
    a second hydraulic cylinder and ram mounted on the other end of the sweeper arm, the ram connected to the pivot arm for pivoting the vertical pivot shaft and the brooms mounted on the horizontal drive shaft.

* * * * *